United States Patent Office 3,749,643
Patented July 31, 1973

3,749,643
MEASUREMENT OF URINARY D(—)VANILLYL-MANDELIC ACID
George D. Hegeman, Berkeley, and George L. Ellman, Tiburon, Calif., assignors to The Regents of the University of California, Berkeley, Calif.
No Drawing. Filed Mar. 19, 1971, Ser. No. 126,295
Int. Cl. C12k 1/00
U.S. Cl. 195—103.5 R                                    6 Claims

ABSTRACT OF THE DISCLOSURE

A method for determining the amount of D(—)vanillylmandelic acid in human urine is described wherein D(—)vanillylmandelic acid is converted in the presence of an enzyme preparation containing D(—)vanillylmandelic acid dehydrogenase to vanillyl glyoxylate, some of the glyoxylate further converted in the presence of the enzyme preparation to vanillin. The amounts of vanillyl glyoxylate and vanillin thus formed can be quantitatively measured using standard spectrophotometric assay techniques.

---

This invention relates to assay methods for the quantitative measurement of D(—)vanillylmandelic acid in human urine, and more particularly to a stereospecific assay method wherein D(—)vanillylmandelic acid is enzymatically converted to products which themselves may be quantitatively measured using standard analytical techniques.

Vanillylmandelic acid, hereinafter alternatively referred to as VMA, is a major metabolite of epinephrine and norepinephrine in man. Abnormal levels of VMA in the urine are important indicators of certain disease states, including schizophrenia and pheochromocytoma. High VMA levels are found in numerous other conditions that lead to elevated rates of metabolism of its precursor neurohumors, epinephrine and norepinephrine. A variety of stressful conditions have been shown to elevate VMA excretion as it is a major metabolite of the catecholamines. Changes in rate of VMA excretion are of considerable interest as methods of following these hormones.

Only the D(—) form of vanillylmandelic acid is a metabolite. However, L vanillylmandelic acid may also be present in human urine, the L isomer usually introduced to the body by ingestion of foods. Thus, to be biologically meaningful, any assay procedure for D(—)vanillylmandelic acid must be stereospecific for the D isomer alone.

Previous suggestions for determining the concentration of D(—)VMA in human urine have included the use of extraction or purification techniques such as column chromatography. These processes require a variety of reagents, and are relatively time consuming to run. Large variabilities in the assay results are also easily introduced.

Accordingly, it is an object of this invention to provide an accurate assay technique specific for measurement of D-vanillylmandelic acid.

It is a further object of this invention to provide an assay technique specific for D(—)vanillylmandelic acid which can be carried out rapidly and conveniently.

Accordingly, a stereospecific assay technique has been developed wherein only D(—)vanillylmandelic acid is enzymatically converted to vanillyl glyoxylate, some of the glyoxylate thus formed further converted to vanillin. The amount of the enzymatic reaction products formed, directly proportional to the amount of VMA initially present in the urine sample, may readily be measured using standard spectrophotometric techniques, e.g. UV absorption and fluorescence analysis. Still further, the products may be converted to other compounds which themselves may be quantitatively measured.

The D(—)VMA is converted in the presence of an enzyme preparation containing D(—)mandelic acid (acceptor) oxidoreductase, hereinafter referred to as D(—)mandelic acid dehydrogenase, to vanillyl glyoxylate and further to vanillin in the manner illustrated below:

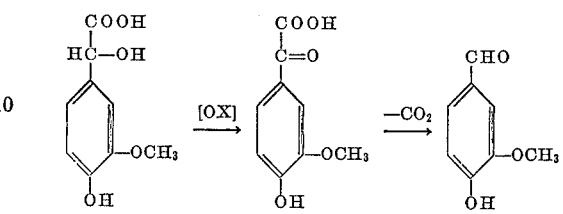

For the fluorometric and absorption techniques hereafter discussed, it is not necessary to resolve the reaction products as their measured spectrophotometric properties are substantially the same: the observed readings in these assays comprise a summation of the contributions of each product.

The rate of glyoxylate formation for an enzyme preparation of uniform activity will be a function of the enzyme concentration in a given urine assay mixture. Sufficient enzyme should be added to each sample to obtain measurable quantities of glyoxylate and vanillin within reasonable periods of time. It has been found that optimum mandelic acid oxidation rates are achieved with the reaction system maintained at a pH of 6.5. Lower rates of glyoxylate formation are observed at higher or lower pH's.

The amount of D(—)VMA present in a given urine sample is determined by measuring the quantitative yield of vanillyl glyoxylate and vanillin and comparing these yields to yields observed for samples of known D(—)VMA concentration reacted under identical conditions.

As previously mentioned, these quantitative determinations can be made using standard spectrophotometric assay procedures. In the case of UV light absorption analysis, the extinction value of a given urine sample treated with the D(—)mandelic acid dehydrogenase is measured. The amount of the reaction products formed is determined by comparing the extinction value of the untreated sample to the extinction value for samples reacted with the enzyme preparation. In the case of vanillyl glyoxylate or vanillin, a characteristic light absorption value in the ultraviolet range, that is 345 nm., at high pH is observed.

In the case of fluorometric analysis, the enzymatic reaction product is mixed with a buffered solution of a chemical material which will react with the enzymatic reaction products to form a fluorescent material. Alternatively, the enzyme and the chemical agent can be premixed and the urine sample added directly to the mixture. In this instance, the conversion of the glyoxylate and vanillin to the fluorescent material will occur as the enzymatic reaction products are formed.

A particularly preferred chemical agent is 1,2-diamino naphthalene. The enzymatic reaction products can similarly be reacted with 2,3-diamino naphthalene to form fluorescent compounds. Such compounds, however, do not yield the intense fluorescence afforded by the products of the 1,2-diamino naphthalene reaction. Diaminobenzoic acid and diaminobenzene may also be used to form fluorescent derivatives from the keto acid and aldehyde products of the enzymatic conversion.

It has been observed that fluorometric analysis is about 20–40 times more sensitive than UV absorption analysis, permitting the measurement of much smaller concentrations of D(—)VMA. Particularly, combined glyoxylate-vanillin levels as low as $9.4 \times 10^{-8}$ molar may be detected by fluorometric analysis, while levels no lower than $4 \times 10^{-6}$ molar are detectable using UV absorption analysis.

Accordingly, lesser amounts of the enzyme need be used to conduct the fluorometric assay than are required to conduct the UV absorption assay. Sufficient enzyme preparation must be added, however, to insure that within the chosen time period at least the minimum detectable level of glyoxylate and vanillin is formed. As the D(—)VMA conversion rate is primarily a function of enzyme concentration at lower enzyme concentrations, less VMA is converted to the keto and aldehyde derivatives. To obtain the initial D(—)VMA concentration in a given urine sample, the fluorescence of the conversion products is measured and compared to the fluorescence values for similar samples of known D(—)VMA concentrations which have been reacted with the same amount of enzyme for the same amount of time. By using less enzyme material, costs are reduced. Accuracy of the determinations is also increased because of the reduction in interfering turbidity in the sample.

The D(—)mandelic acid dehydrogenase employed is derived from bacterial Strain MB-15 of K. Hosakawa which is isolated from soil by benzoate enrichment and has been identified as Pseudomonas putida A. It is on deposit with the American Type Culture Collection (ATCC 17426). The organism is cultivated at 30° C. with vigorous aeration in a mineral medium containing a mixture of inorganic salts such as sodium and potassium phosphates, calcium chloride, magnesium sulfate, and the like, as well as various organic compounds as the sole sources of carbon and energy. The mineral medium employed in cultivation is further described by Hegeman in "Synthesis of the Enzymes of the Mandelate Pathway by Pseudomonas putida," J. Bacteriol, 91, 1140–1154 (1966), incorporated herein by reference.

It is important for production of the enzymatic reagent that the cells be grown in a medium containing mandelate. This mandelate is conveniently supplied as a mixture of the D and L isomers. With the racemate of mandelic acid as the sole carbon and energy source, only the D isomer is oxidized. Resolved L mandelate, which is employed in the preparation of certain pharmaceutical and organic chemicals constitutes an important byproduct which can easily be recovered by standard physical techniques.

The bacteria are grown until there is no observable increase in turbidity of the culture. Harvesting of the cells during the late exponential growth period is thus assured. The cell walls are thereafter broken down to release the enzyme. The broken cell walls are removed, and the enzyme recovered suspended in a pink paste of cell protoplasm. This paste can be stored for up to a year at 0° C. with no detectable loss of activity.

In a preferred tetchnique, the cells are harvested by suspension in a buffer such as 0.1 M tris (hydroxymethyl) amino methane-chloride in water (pH 8.0). The cell walls are broken open by sonic vibrations. After cell disruption, the remaining whole cells and cell debris are removed by centrifugation at low speeds (e.g., 3,000 g.). The supernatant fluid is further centrifuged at high speeds, e.g., 105,000 g. to sediment the membrane fraction. This sediment fraction, containing a small amount of entrained soluble material, is resuspended by vigorous agitation in the 0.1 M buffer solution which in addition contains 40% (v./v.) ethylene glycol to form a uniform pinkish-brown suspension. The suspension serves as the analytical reagent and contains the D(—)mandelic acid dehydrogenase. The D(—)mandelic dehydrogenase exhibits sufficient activity to carry out the quantitative conversion of the D(—)vanillylmandelic to the corresponding keto acid at an appreciable rate.

Though more complicated and time consuming than the absorption and fluorometric assay techniques outlined above, other techniques may be employed to measure the amount of vanillyl glyoxylate and vanillin formed in the enzymatic conversion. For instance, the reaction products can be separated from the mother liquor such as by paper, thin layer, gas-liquid column or high-speed liquid solid or ion exchange chromatography. Separation can also be achieved by preferential liquid-liquid extraction, fractional sublimation or distillation, electrophoresis, or by counter-current distribution. Once the vanillyl glyoxylate and vanillin are isolated from the reaction mass, they can be quantitively measured by such methods as isotope dilution employing a radioactively labelled product with subsequent purification and measurement. Additionally, products measurable by gas chromatography techniques can be formed either directly or as a derivative of the reaction products. Yet further purification of the glyoxylate may be carried out and the purified products reacted with a diazonium compound to form colored compounds.

The following examples are presented to illustrate the present invention.

EXPERIMENT 1

(A) Preparation of D(—)mandelic acid dehydrogenase

A culture of Pseudomonas putida A was cultivated by growing 500 ml. cultures with shaking in 2.7 l. Fernbach Flasks. Two such cultures were used to inoculate 11 l. of a mineral culture medium containing 0.02 M ammonium D,L-mandelate as the sole carbon energy source in each of 3 Model F–14 New Brunswick fermentors. The generation time was 60 minutes at 30° C. Growth was allowed to occur with strong aeration and rapid agitation until the culture attained a turbidity of 250 units (Klett-Summerson colorimeter fitted with a No. 66 filter). At that time roughly 75 percent of the culture was removed from the fermentor vessels and harvested in a Sharples continuous-flow centrifuge. The fermentors were refilled by the addition of 8 l. of new, prewarmed culture medium that was prepared without aseptic precautions, and growth was allowed to resume. This process was repeated twice and yielded a total of 250 g. of wet cells. A portion of the cell paste was frozen at —20° C. Under these condtions, the cell paste may be stored for extended periods of time without detectable loss of activity.

(B) Recovery of D(—)vanillylmandelic acid dehydrogenase

The cell paste was suspended in four times its weight of 0.1 M $Na_2HPO_4$-$KH_2PO_4$ buffer (pH 6.8) by vigorous agitation. The suspension was then treated in 50 ml. batches in a Raytheon (Model DF 101) 10 kHz. sonic oscillator for 20 minutes at maximum power. This sonic destruction of the cells was carried out at 0–4° C. The batch was then centrifuged at 5000 g. for 10 minutes to remove the unbroken cells and cell debris which was discarded. The decanted supernatant fluid was thereafter recentrifuged at 29,000 r.p.m. (approximately 105,000 g.) for 90 minutes in a Spinco centrifuge (#30 head) to sediment the particulate component of the crude extract. The recovered solid matter was resuspended and rinsed with cold 0.05 M phosphate buffer (pH 6.8) and recentrifuged. The material was resuspended in a small amount of buffer. Ethylene glycol was then added to the buffer solution and the concentration adjusted to 40 volume percent ethylene glycol.

(C) UV absorption analysis

An assay mixture of a buffer and an enzyme solution was first prepared. The buffer solution contained 0.25 M citric acid adjusted to a pH of 6.5 with concentrated sodium hydroxide. The enzyme solution was a mixture of 10 ml. of the enzyme preparation of part B above, 15 ml. of ethylene glycol, and 75 ml. of water.

To a mixture of 1 ml. of the buffer and 1 ml. of the enzyme solution was aded 1 ml. of a urine sample containing an unknown amount of vanillylmandelic acid and the mixture incubated in a water bath for two hours at 37° C. Thereafter, 2 ml. of a reagent solution containing 2 percent sodium dodecyl sulfate and 0.15 N NaOH was added to kill the enzyme and reduce the turbidity. The sample was allowed to incubate for an additional two hours while being maintained at 37° C.

An enzyme blank was similarly prepared by mixing 1 ml. of the same urine sample, 1 ml. of the buffer and 1 ml. of an enzyme preparation which had been previously heated at 60° for one hour to kill the enzyme activity. The blank was incubated for two hours, 2 ml. of the reagent solution added, and incubation then continued for an additional two hours.

The extinction values for the assay sample and blank were measured using a Beckman DU spectrophotomer. The concentration of the VMA in the sample was determined as follows:

$$C = K(D)[E(A) - E(B)]$$

wherein C is the concentration of the VMA, K is an absorbency constant, the value of which is determined from samples of known vanillin concentrations, E(A) is the extinction value of the essay sample, E(B) is the extinction value of the enzyme blank, and D is the dilution factor. The extinction values, measured at 345 nm. were as follows:

$$E(A) = 0.968;\ E(B) = 0.866$$

The dilution factor was 5 and the absorbency factor, calculated from a sample of known vanillin concentration, was $1/2.65 \times 10^4$. The calculated concentration of the D(—)VMA was $0.193 \times 10^{-4}$ moles/liter.

EXAMPLE 2

Fluorimetric analysis

An assay mixture and enzyme blank similar to those of Example 1 for a urine sample of unknown D(—)VMA concentration was prepared as follows:

|  | Assay mixture A | Enzyme blank B |
|---|---|---|
| Urine sample, ml | 0.10 | 0.10 |
| Buffer, ml [1] | 0.10 | 0.10 |
| Enzyme solution, ml [2] | 0.10 |  |
| Enzyme blank, ml [3] |  | 0.10 |

[1] 0.25 M citric acid to which sufficient sodium hydroxide is added to raise the pH to 6.5, sufficient water then added to adjust the total citrate concentration to 0.15 M.
[2] 10 ml. of the enzyme preparation of Example 1 admixed with 15 ml. of ethylene glycol and 75 ml. of water.
[3] Enzyme solution heated for one hour at 60° C.

The samples were incubated in a water bath for two hours at 37° C. Thereafter, 5 ml. of a reagent solution containng 1 ml. of 1,2-diaminonaphthalene (1 mg./ml. in 95% propanol), 1 ml. of a 10 percent aqueous solution of sodium lauryl sulfonate and 48 ml. of a buffer solution pH 3.0 (citrate concentration 0.05 M), was added, and the samples reincubated for another two hours. After incubation, the fluorescence of each sample was measured under an excitation of about 330 nm., with an expected emission of 400 nm. with an Aminco Keirs spectrophosphorimeter.

The concentration of the unknown sample was determined as follows:

$$C = L(M)D[F(A) - F(B)]$$

where C is the concentration, D is the dilution factor, L is a conversion constant, M is the meter multiplier of the fluorimeter, F(A) is the numerical value above the dark current produced by the read-out of solution A, and F(B) is the numerical value above the dark current produced by the read-out of solution B. Using a sample of known VMA concentration the L value was found to equal $1/1.18 \times 10^6$. M for the meter was 0.03 and D was 5.3/0.1. The measured value of F(A) was 40.9 and the measured value for F(B) was 26.4 the calculated concentration of VMA, $0.196 \times 10^{-4}$ moles/liter.

Deionized water was used in both of the above experiments. The ethylene glycol in the enzyme preparation was added as a preservative to prevent bacterial growth, degradation of the enzyme, and clumping of the particulate matter during the reaction. In the fluorometric study, heated unreacted enzyme was used as a blank since a small amount of turbidity changes the level of fluorescence measurable in the assay. The sodium lauryl sulfonate and sodium dodecyl sulfonate were added to solubilize the main portion of the enzyme in the two hours of incubation.

The assay methods of this invention are uniquely simple and trouble free. Only relatively unsophisticated equipment and personnel need be employed for their execution. It is likely that these techniques may be adaptable for automated analytical procedures, and therefore may be especially well suited to kinetic experiments or mass sampling and screening studies that are impractical or tedious with currently available techniques. Aside from the enzyme preparation, only a small number of common laboratory reagents are needed.

No other known method has the specificity conferred by the in vitro use of enzymatic reagents to convert the D(—)isomer of VMA to the chemical species actually measured. This fact renders the method uniquely free of interference which is often encountered with colorimetric methods.

The invention described herein was made in the performance of work under a research grant from the United States Public Health Service.

Having thus described our invention, other modifications will be readily apparent to those of ordinary skill in the art and are deemed within the scope of the present invention which is defined by the appended claims.

What we claim is:

1. An assay method for stereospecifically determining D(—)vanillylmandelic acid in a biological fluid which comprises:
   introducing into said biological fluid a composition containing D(—)vanillylmandelic acid dehydrogenase;
   incubating the sample for a time sufficient to result in conversion of a measurable amount of any D(—) vanillylmandelic acid present; and thereafter,
   determining the amount of conversion product so formed.

2. A method according to claim 1 wherein the determination is by ultraviolet spectroscopy.

3. A method according to claim 1 wherein the conversion product is determined by adding a chemical agent to convert said conversion product to a fluorescent chromophore and thereafter measuring the fluorescence of the chromophore so formed.

4. A method according to claim 3 wherein said chemical agent is 1,2-diaminonaphthalene.

5. A method according to claim 1 wherein said enzyme composition is a composition according to claim 1.

6. A method according to claim 1 wherein said biological fluid is urine.

References Cited

Chemical Abstracts, vol. 74, p. 865 (1971).

LIONEL M. SHAPIRO, Primary Examiner

U.S. Cl. X.R.

195—62